April 9, 1940. K. W. FISCHER ET AL 2,196,551
WINDOW CLEANING DEVICE
Filed Dec. 8, 1938
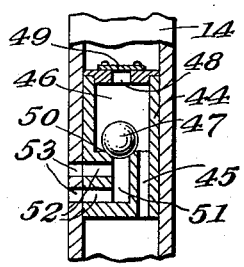
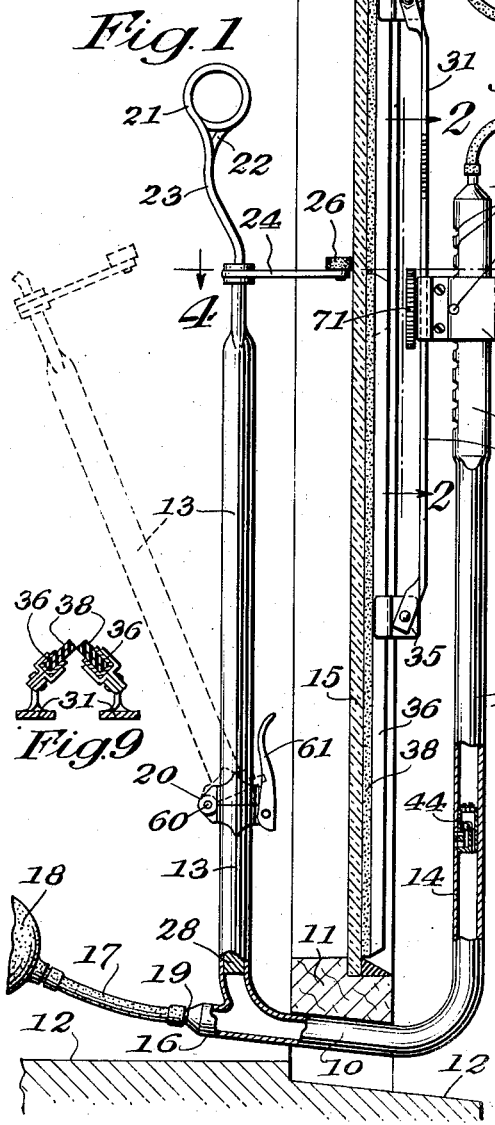
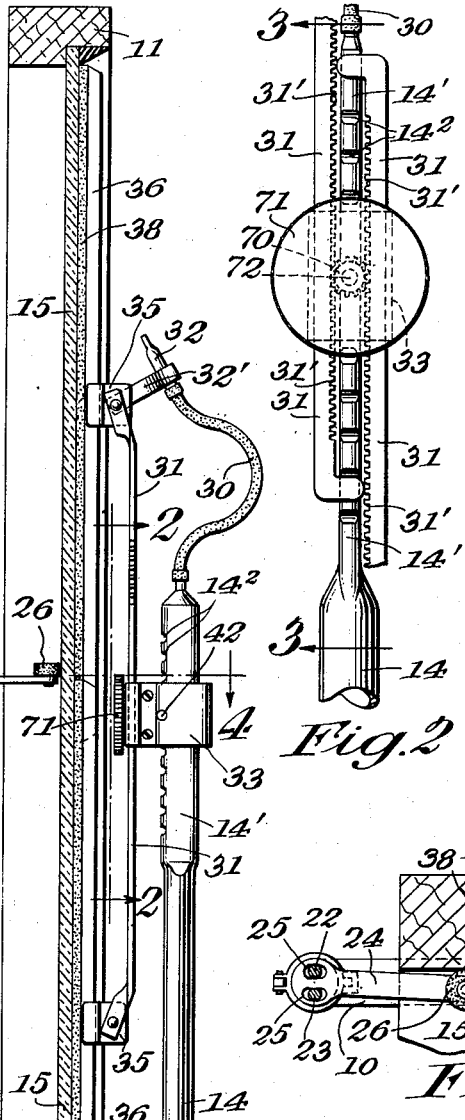
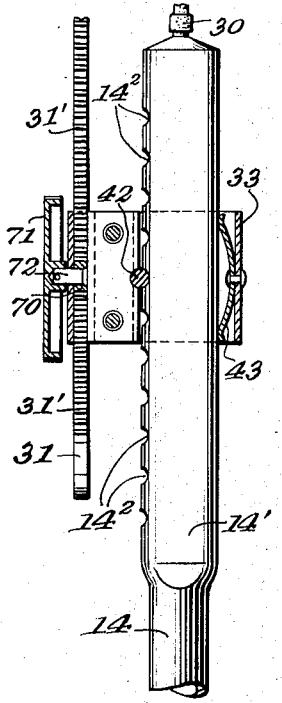
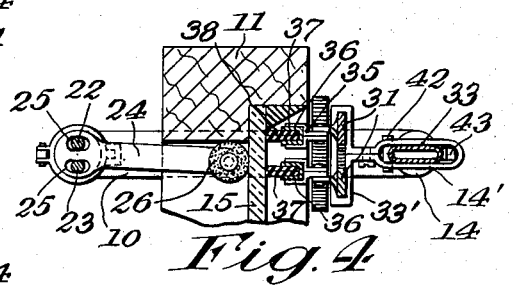
INVENTORS:
Karl W. Fischer and
John Kadis-Ohlen
BY Spear Rawlings + Spear
ATTORNEYS.

Patented Apr. 9, 1940

2,196,551

UNITED STATES PATENT OFFICE 2,196,551

WINDOW CLEANING DEVICE

Karl W. Fischer, Hyde Park, and John Kadis-Ohlen, Roxbury, Mass.

Application December 8, 1938, Serial No. 244,618

6 Claims. (Cl. 15—250)

Our present invention relates to improvements in the art of window cleaning and to devices by means of which the outside of the sash of any usual window may be readily cleaned from within the room.

In any window washing operation, particularly if on a large scale as in apartment houses or office buildings, it has come to be necessary to have a professional who with suitable harness may operate from the outer window ledge even though at great heights. Even in private homes the operation is difficult and risky and not covered by ordinary insurance.

Many people are more or less affected by altaphoebia or dizziness in leaning out of a window. Our invention provides for simple and easily worked portable devices of high efficiency and inexpensive construction.

It has been proposed to install window cleaners operable from the inside but these have been mostly for automobile windshield use and too expensive and not adapted to window service.

Practical experience has indicated that the so-called squeegee or rubber wiper gives the most satisfactory finish or polish to the glass. To effect this, however, the rubber wiper must have a completely wetted surface over which to travel.

It has been proposed to use sponge, felt or other wet or wetted wiping means, but this is fatal to best results as such wet wipers simply pick up dirt and smear. We overcome this by a means for simultaneously but independently wetting the surface of the glass over which the wiper blade is travelling so that it picks up a wave to wash, carry off the dirt and at the same time keep the wiping edge free from muddy or gritty accumulations which would destroy the efficiency of the device and spoil the method of cleaning.

As illustrative of our invention we have shown in the accompanying drawing embodiments well adapted to practical use, easily moved from window to window and compact for storage when not in use by reason of its collapsible or other features, all as will be more fully pointed out in the following description of its construction and use.

In the drawing:

Fig. 1 is a view, partly in section, of one of our window cleaners applied to a window indicated in vertical section through a sash and a fragment of sill with blades extended.

Fig. 2 is an enlarged face view of the wiper blade end of the outside arm indicated as broken off just below its blade unit supporting clip, as sectioned on the line 2—2, Fig. 1.

Fig. 3 is a partly sectioned side view of the same, on the line 3—3, of Fig. 2.

Fig. 4 is a partly sectioned view on the indicated line 4—4, of Fig. 1, showing one of the wiper blades in extreme position against the side of the sash.

Fig. 5 is a partly sectioned detail of the hinge and lock of the inside arm.

Fig. 6 is an end view of the double discharge nozzle.

Fig. 7 is a face elevation of the same.

Fig. 8 is an enlarged fragmentary view in partial vertical section through the fluid conduit, particularly detailing the check valves, and Fig. 9 is a detail of the wiper blades removed, better to show their preferred angular disposition.

Our device comprises a U-shaped supporting member or base 10 adapted to be interposed between the bottom edge of the lower window sash 11 and the window sill or ledge 12 (see Fig. 1) or in the reversed position of the parts (not shown) between the upper edge of the upper sash and the top cross member of the window casing.

The supporting base 10 includes an inside tubular arm 13 and an outside tubular arm 14. The inside arm extends rearwardly away from the window pane 15 and thence upwardly substantially parallel with it. At some point, preferably conveniently near its lower end, it is provided with an offset fitting 16 to which the discharge end 17 of a bulb 18 or its equivalent is attached, the outer end of the offset 16 being nippled to receive it as at 19. The bulb is a syringe adapted to feed a supply of cleansing fluid. This may be a soapy or polishing mixture which on compression of the bulb of the syringe is forced into and along the member 10 and upwardly through the outside arm 14, for distribution onto the outside surface of the window pane through the double barrel discharge nozzle 32.

The bulb 18 may feed from any convenient container as a pail or jar (not shown) and may be connected to pump to the nozzle 32 where it discharges as a spray or it may be connected to atomize where a liquid cleaner is used.

Alternatively, the syringe 18 may be omitted and the cleaning fluid supplied under pressure to the outer arm 14 by other suitable means, as for example, a pump through a flexible tube.

Just above its lower end the inside arm 13 is provided with a hinge 20 which couples its parts in an adjustable manner to the lower base 10. The construction of the fitting 20 is such that the handle member 21 may be swung laterally with reference to the inside arm 13 so that it may be folded out of the way or swung up as shown in full lines in Fig. 1. The handle is preferably of wire round in cross section (Fig. 4) and twisted into a finger engaging double loop with its ends 22 and 23 suitably attached to the upper end of the inside arm member 13.

The wire of the handle 21 is preferably slightly resilient. On it is mounted a radial arm 24 having a pair of curved slots 25 through which the wires 22 and 23 project, and which permits a limited motion of the arm 24 in swinging relative to the vertical axis of the inside arm 13. This permits the roller 26 to trail with a slight pressure against the inside of the glass 15 and also to yield when the device is traversed to an extreme position as indicated in Fig. 4, in which one of the blades 37 is shown as having come in contact with the sash 11, the arm thus yielding after making its own contact to permit the blades to complete their stroke. The two sections of the inner arm 13 are pivoted together as at 60. A latch 61 is provided for the upper section to keep it erect as in Fig. 1, in which position the notch 62 engages a pin 63 on the hinge member 60 to hold it closed. It is normally held shut by a spring detent 64.

The roller 26 on the arm 24 is preferably of rubber and forms a resilient bearing member disposed towards the inner face of the window pane for free rolling engagement with it as the entire device is manipulated back and forth across the window.

The entire construction provides an adjustable unit by means of which the device in its entirety may be traversed back and forth over the window, the handle 21 affording a grip enabling convenient manipulation of the device.

Preferably we interpose between the upper end of the arm 13 and its lateral offset 16 a plug or stop washer 28 or its equivalent to prevent any back flow of the cleaning fluid upwardly along the arm 13.

The outer arm 14 is bent to extend vertically upward along the outer face of the window and substantially parallel to it. At its upper end it is equipped with a fastening 33 in the nature of a clamp or its equivalent to receive the upper end of the arm 14 which is flattened at 14' and is connected to the lower end of an extension conduit 30. The arm 14 extends a substantial distance upwardly along the outside of the window and adjacent its upper end has releasably clamped to it a two-part wiper carrying rack beam 31 which lies closely adjacent the outer face of the window pane substantially parallel therewith. The upper end of the member 30 is formed as a restricted double discharge nozzle 32. The connection between the member 30 and the member 31 may take any convenient form. As shown it is an elongated clamp 33. The closed part of said clamp is adjustably held on the flattened end 14', notched at 14² to engage a pin 42 across the clamp. Engagement is made by the leaf spring 43. The arms 33' of said clamp 33 slidably embrace and guide the two flat rack beams or bars constituting the rack beam 31 (see Fig. 4).

While we have shown only a single tube 30 at the upper end of the outer arm 14 of the device, it will be understood that where necessary we may employ a pair of such tubes connected to the double nozzle 32 so as to give the best possible spray.

The wiper unit includes an upper and a lower wiper blade 38. These are pivotally attached to the ends of the rack bars by means of suitable brackets 35, the upper of which carries a steadying clip 32' for the nozzle 32.

The inner faces of the brackets 35 are bent to conform to the curvature of a U-shaped reinforcement member 36. Received within the channel of the reinforcement member 36 is a rubber or equivalent squeegee wiper blade. (See Fig. 4.)

Arranged within the outer arm 14 at some convenient point we preferably have a check valve 44. (See Fig. 8.) The valve 44 is provided with a vertically disposed series of passages 45. As shown in Fig. 8, these are disposed about the perimeter of the valve 44. At their upper ends they open into a chamber 46 containing a ball check 47. The upper end of said chamber is perforated as at 48 and provided with a flapper valve 49 which opens with the pressure. When the device is positioned as in Fig. 1, the fluid under pressure from the bulb 18 escapes through passages 45 into chamber 46 and out therefrom through passage 48 and into the conduit 30 and out through nozzle 32.

When the device is removed from beneath the window as positioned in Fig. 1 and applied in upside down position as may be sometimes necessary, the fluid action is reversed in that the ball check 47 is unseated from its seat 50 over the end of an axial passage 51 also formed in the valve 44 and the fluid escapes through said passage 51 laterally outward through communicating passages 52 in the valve 44 which register with openings 53 in the member 14. In this position of the parts, the ball check 47 seals the opening 48.

In putting the device in place, the blades 36 are run out or adjusted to window capacity. For this we provide a pinion 70 meshing with the racks 31' to force them in opposite directions. The pinion may be turned by a knurled knob 71 on a post 72 carried by the clamp 33.

Preferably the window cleaning operation is started with the upper window which is pulled down as far as necessary. To apply the device for its operating position, the device is slid under or hung over the top of the window in more or less horizontal posture, depending upon whether an upper or a lower window is being cleaned.

The device is then swung into proper upright working position as shown in Fig. 1, the handle being swung back so that the pressure disc 26 is in proper contact with the inside face of the window pane and the wiper blades in proper contact with the outside face of said pane. The bulb 18 having been filled with the desired cleaning fluid, such fluid on compression of the bulb is forced through and along the conduits 14 and 30 and discharged over the outer face of the window pane at the double discharge nozzle 32 on each side of the blade axis. At the same time or immediately thereafter the entire device is guided back and forth across the window pane by means of the handle member 21 until the entire window is cleaned, sufficient cleaning fluid being applied as needed from time to time and a flushing solution of clear water used for the final operation preceding the actual drying of the window pane itself. Drying may be accomplished by simply wiping the blade back and forth across the window without accompanying supply of water. When cleaned, the device is removed from the window and applied to some other window or folded up and stored away.

The check valve is an automatic two-way valve which enables the proper conveyance and distribution of the cleaning fluid in either the position of the device as shown in Fig. 1, or in the upside-down position. In either position the cleaning fluid is readily and conveniently carried to the outside of the window pane and the window pane is traversed by the wiper blade all by manipulation from within the room. The blades 36 ordinarily overlap except that they may be adjusted to span a gap so that our devices may straddle a transversely partitioned window. They are readily adjustable to any conventional window. The blades are preferably reinforced at points well within the overlap which prevents leaving a line of dirt or unpolished surface. In our devices the blades are readily detachable and replaceable to service windows of different dimension. Usually the upper sash of a window is cleaned by pulling it down and the lower one by pulling it up, but the devices are reversible as before described as windows often stick or there are some obstructions preventing the most simple basis of operation of our cleaners.

Various modifications in the construction and operation of our device may be resorted to if within the spirit and scope of our invention without departing from the limits of the appended claims.

What we therefore claim and desire to secure by Letters Patent is:

1. A window cleaning device comprising a tubular base adapted to be positioned in the space between a cross-rail of a window sash and an adjacent portion of the window casing of a partly-opened window, said base having a portion disposable interiorly of the window and constituting a manipulating handle by means of which the device may be caused to traverse the window and having another and tubular portion extending in part at least substantially vertically of the window exteriorly thereof and constituting a conduit for delivering cleansing or rinsing fluids against the outer surface of the window pane and a moving wiper-carrier, a pair of relatively slidable wipers mounted on said exteriorly disposed conduit portion for traversing movements over the outer surface of the window pane, when said exteriorly disposed conduit portion is moved for a cleaning operation by said manipulating handle, said wipers being movable to varying positions relative to each other so as to extend substantially the full height of the window, means for relatively adjusting said wipers, and means communicating with said exteriorly disposed conduit portion interiorly of the window for supplying fluid under pressure thereto.

2. The device of claim 1, in which the slidable wipers have racks on their corresponding edges and the adjusting means includes a pinion oppositely meshed with the racks for simultaneously moving them in opposite directions.

3. A window cleaning device comprising a reversible tubular U-shaped base adapted to be positioned in the space between a cross-rail of a window sash and an adjacent portion of the window casing of a partly opened window, said base including an upright tubular portion extending interiorly of the window and provided adjacent its upper end with a manipulating handle by means of which the device may be caused to traverse the window and including another tubular portion extending substantially vertically of the window exteriorly thereof and constituting a conduit for delivering cleansing or rinsing fluids against the outer surface of the window pane, a pair of flat superimposed relatively movable rack beams carried by said exteriorly disposed conduit portion adjacent its upper end and disposed in substantially parallel juxtaposed relation to the window pane, means for manually adjusting said rack beams relative to one another, a pair of wipers pivoted adjacent the opposite ends of said beams for traversing wiping movements over the outer surface of the window pane and in the same plane therewith, and means disposed inwardly of the window and communicating with said interiorly disposed tubular portion of the base for supplying fluid under pressure to said exteriorly disposed tubular portion.

4. The device of claim 3, wherein the fluid supply means is connected with a spray delivery disposed adjacent the upper end of said exterior conduit portion of the apparatus.

5. The device of claim 3, the upper end of said outer conduit portion being flattened to provide a slideway, and a clamp adjustable vertically along said slideway and carrying said pair of rack beams.

6. The device of claim 3, the upper end of said outer conduit portion being flattened to provide a slideway, and a clamp adjustable vertically along said slideway and carrying said pair of rack beams, said slideway having a plurality of spaced locking notches, and said clamp having a spring-pressed detent selectively engageable in said notches for holding the adjustment of said clamp.

KARL W. FISCHER.
JOHN KADIS-OHLEN.